(No Model.)

T. MILLER, Jr.
WAGON JACK.

No. 275,931. Patented Apr. 17, 1883.

WITNESSES:

INVENTOR:
T. Miller Jr.
BY
ATTORNEYS.

UNITED STATES PATENT OFFICE.

THOMAS MILLER, JR., OF SPRINGBOROUGH, OHIO.

WAGON-JACK.

SPECIFICATION forming part of Letters Patent No. 275,931, dated April 17, 1883.

Application filed February 16, 1883. (No model.)

*To all whom it may concern:*

Be it known that I, THOMAS MILLER, Jr., of Springborough, in the county of Warren and State of Ohio, have invented a new and Improved Wagon-Jack, of which the following is a full, clear, and exact description.

The object of the invention is to improve wagon-jacks, as hereinafter described, and pointed out in the claims.

Reference is to be had to the accompanying drawings, forming part of this specification, in which similar letters of reference indicate corresponding parts in both the figures.

Figure 1:
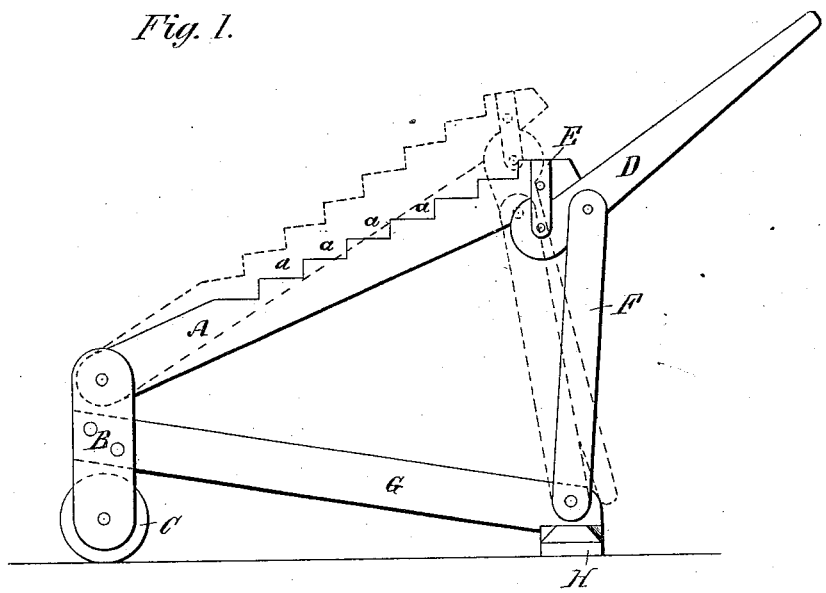
Figure 2:
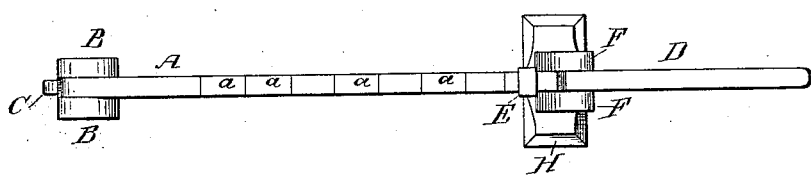

Figure 1 is a longitudinal elevation of my improved wagon-jack. Fig. 2 is a plan view of the same.

A bar, A, provided in its upper edge with a series of offsets or notches, $a$, arranged like steps, is pivoted at its lower end between two short standards, B, between the lower ends of which a small wheel, C, is pivoted. The upper end of the bar A rests upon the rounded end of a lever, D, fitting within a recess in the bottom edge of the bar, which lever is pivoted between two clips, E, fastened to the sides of the bar A and projecting from the bottom edge of the same. A short distance from the clips E, and toward the free end of the lever, the said lever is pivoted to one or two bars, F, having their lower ends pivoted to one end of a bar, G, having its opposite end secured between the standards B. The bar G is provided at that end at which the bars F are pivoted to it with a base-block, H, on which base and the wheel C the jack rests. The jack is passed under the axle of the vehicle until the axle rests upon one of the offsets or steps $a$ of bar A. Then the free end of the lever D is depressed, whereby the upper end of the bar A will be raised and will raise the axle thereon, so as to permit removing the wheel from the axle. If the lever D is depressed until it rests against or between the bars F, the bar A will be locked in position, as the line of pressure will be outside of the three pivots or joint-points. By means of my improved jack a heavy wagon can be raised easily. If one end of the jack is raised, it can be moved about easily on the wheel C. The clips E only serve to hold the end of the lever D in place on the end of the bar A.

Having thus described my invention, I claim as new and desire to secure by Letters Patent—

1. A wagon-jack supported in front on a wheel, C, and at the rear on a transverse oblong block, H, as shown and described.

2. In a wagon-jack, the bar A, provided with offsets $a$, and a recess in its lower edge at one end, the lever D, provided with a rounded end, the bars F and G, and the standards B, combined substantially as herein shown and described, and for the purpose set forth.

3. In a wagon-jack, the standards B, the wheel C, the bar A, provided with offsets $a$, the lever D, the bars F, and the bars G, combined substantially as herein shown and described, and for the purpose set forth.

4. In a wagon-jack, the standards B, the wheel C, the bar A, provided with offsets $a$, the lever D, the bars F and G, and the base-block H, combined substantially as herein shown and described, and for the purpose set forth.

5. In a wagon-jack, the standards B, the bar A, provided with offsets $a$, the clips E, the lever D, and the bars F G, combined substantially as herein shown and described, and for the purpose set forth.

THOMAS MILLER, JR.

Witnesses:
W. P. PEEBLES,
J. A. PEEBLES.